(12) United States Patent
Melton et al.

(10) Patent No.: US 10,287,027 B2
(45) Date of Patent: May 14, 2019

(54) EXPANDABLE FLEXIBLE FUEL TANK DEVICE AND SYSTEM FOR EXTERNALLY PRESSURIZED FUEL SYSTEMS

(71) Applicant: Raytheon Company, Waltham, MA (US)

(72) Inventors: Clayton B. Melton, Tucson, AZ (US); Keith A. Elkins, Tucson, AZ (US); Thomas M. Seach, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/284,419

(22) Filed: Oct. 3, 2016

(65) Prior Publication Data

US 2018/0093780 A1  Apr. 5, 2018

(51) Int. Cl.
*B64D 37/10* (2006.01)
*B64C 39/02* (2006.01)
*B60K 15/03* (2006.01)

(52) U.S. Cl.
CPC ............ *B64D 37/10* (2013.01); *B64C 39/024* (2013.01); *B60K 2015/03026* (2013.01); *B60K 2015/03052* (2013.01); *B60K 2015/03171* (2013.01); *B60Y 2200/51* (2013.01); *Y02T 50/44* (2013.01)

(58) Field of Classification Search
CPC .......... B64D 37/00–37/06; B60K 2015/03171; B60K 15/03; B60K 15/03006; B60K 2015/03013–2015/03026

USPC ................. 220/720, 560.05, 723, 562–567.3
See application file for complete search history.

(56) References Cited

U.S. PATENT DOCUMENTS

| | | | | |
|---|---|---|---|---|
| 3,747,800 A | * | 7/1973 | Viland | B60K 15/03504 220/560.02 |
| 4,091,952 A | * | 5/1978 | Capdevielle | B65D 88/62 220/530 |
| 4,524,609 A | | 6/1985 | Sharp | |
| 4,648,523 A | * | 3/1987 | Strock | B65D 90/501 220/530 |
| 5,072,623 A | * | 12/1991 | Hendershot | B29C 63/34 220/560.03 |
| 5,117,677 A | * | 6/1992 | Hendershot | G01M 3/32 340/605 |
| 6,024,724 A | * | 2/2000 | Lee | A61M 5/152 604/131 |
| 6,260,544 B1 | * | 7/2001 | Spry | B60K 15/03504 123/516 |
| 6,929,160 B2 | | 8/2005 | Elstone, Sr. et al. | |

(Continued)

*Primary Examiner* — Kareen K Thomas

(57) ABSTRACT

An expandable liquid tank device is secured to a vehicle to provided externally pressurized fuel to the fuel system of the vehicle. The tank can comprise an outer bladder containing a flexible inner bladder. An end plate can secure the bladders to the vehicle. Upon depositing fuel into the flexible inner bladder, the outer bladder expands and conforms to a tank region of the vehicle. The outer bladder (a pliable material) transitions from a flexible state to a semi-rigid or substantially rigid state upon depositing fuel into the flexible inner bladder. To provide pressurized fuel to the vehicle, pressurized gas is injected between the bladders, which exert pressure against the flexible inner bladder to dispense the fuel through the end plate and to the fuel system. A method of making the tank and dispensing fuel is provided.

14 Claims, 6 Drawing Sheets

(56) References Cited

U.S. PATENT DOCUMENTS

| | | | | |
|---|---|---|---|---|
| 8,523,001 B2* | 9/2013 | Acker | ........................ | F16J 3/02 |
| | | | | 220/581 |
| 8,944,109 B2* | 2/2015 | Mueller | ................ | F24D 3/1016 |
| | | | | 138/30 |
| 9,085,229 B2* | 7/2015 | Gattozzi | ................. | B29C 49/20 |
| 2008/0209918 A1* | 9/2008 | White | ....................... | F17C 5/02 |
| | | | | 62/50.1 |

* cited by examiner

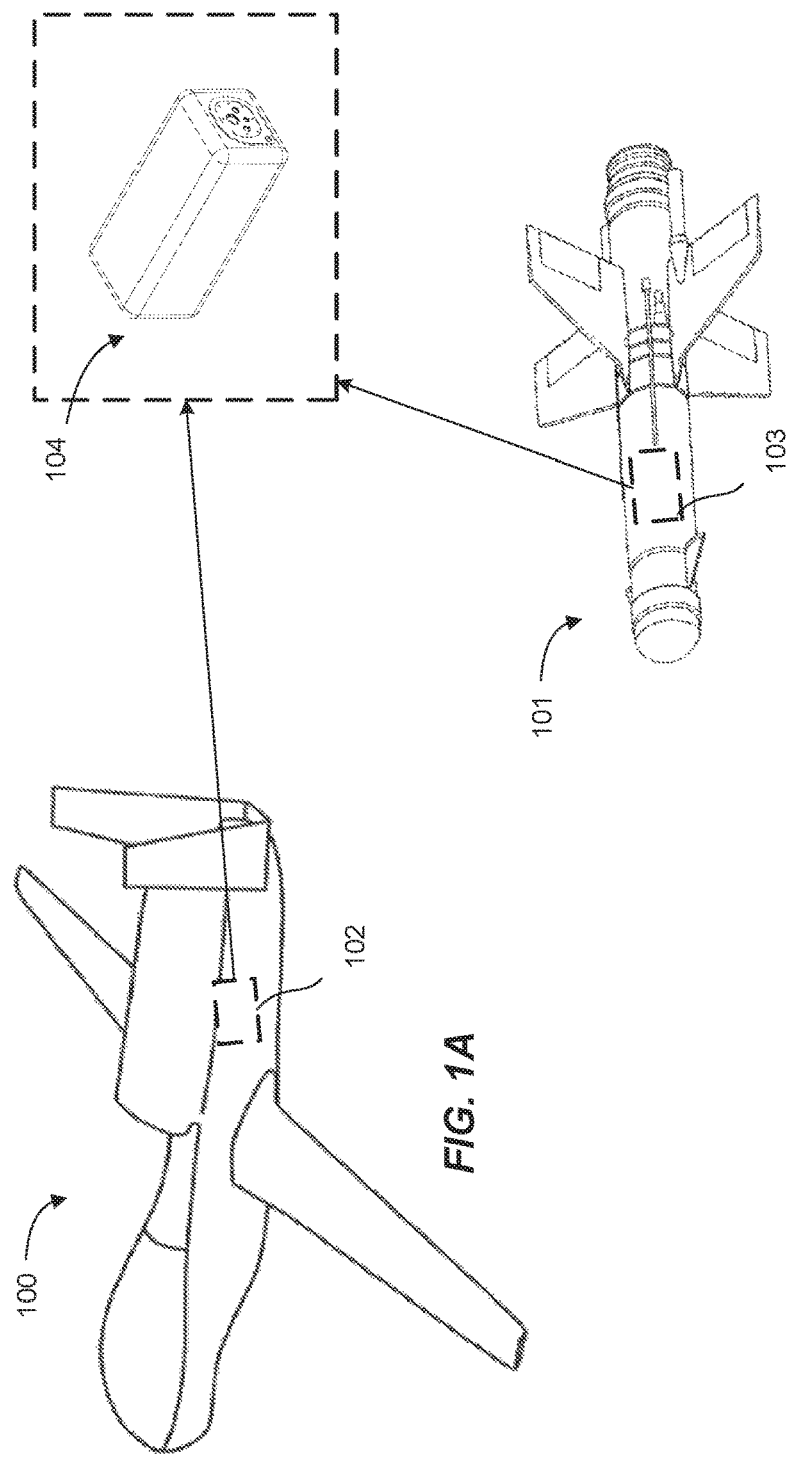

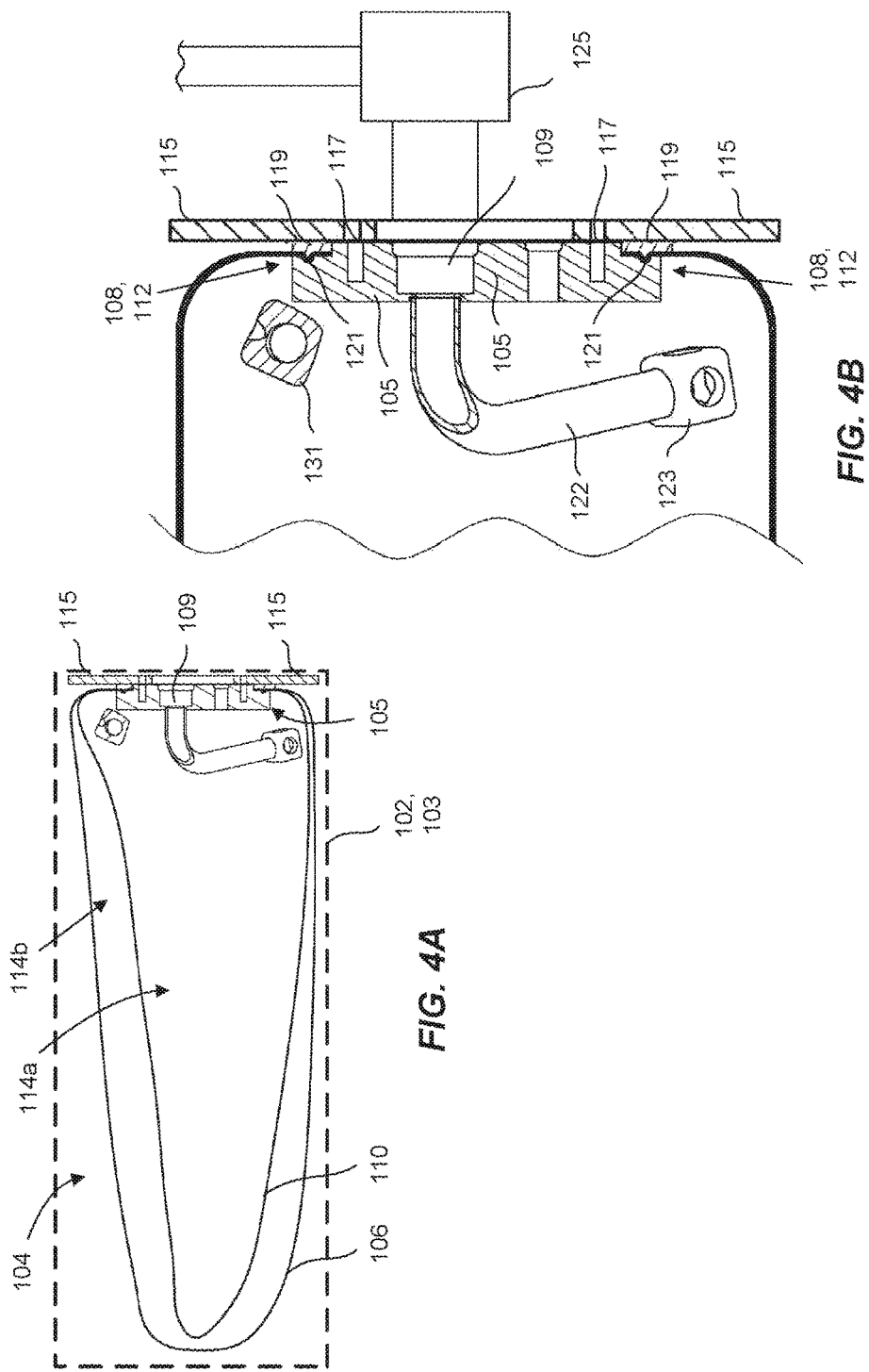

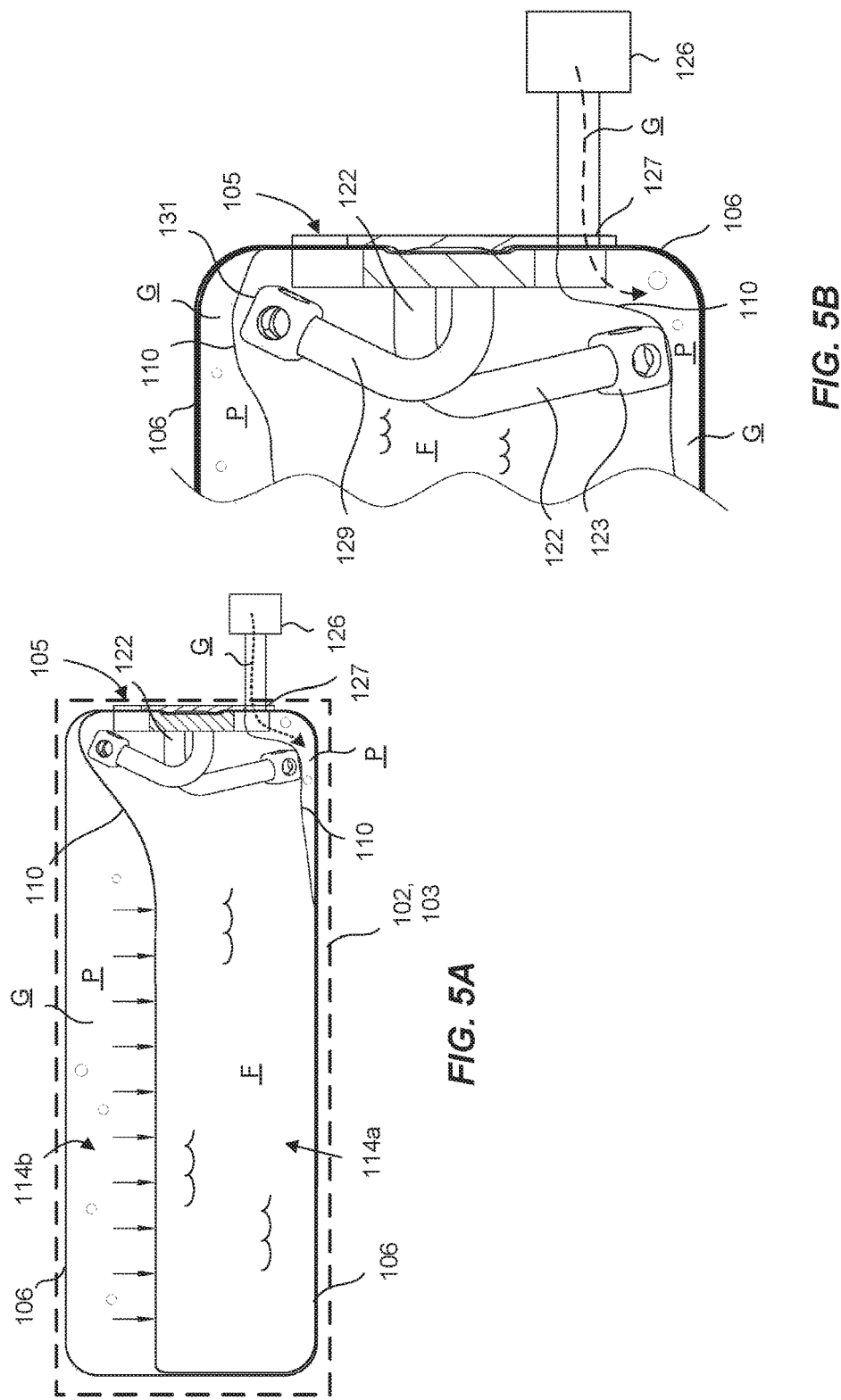

EXPANDABLE FLEXIBLE FUEL TANK DEVICE AND SYSTEM FOR EXTERNALLY PRESSURIZED FUEL SYSTEMS

BACKGROUND

A fuel tank in a vehicle (such as aircrafts) is typically comprised of a rigid metal container to hold fuel for consumption by the vehicle. This container in an aircraft is typically accessible via a large metal tank access door secured to the aircraft. Some fuel tanks may have a flexible bladder internal to the metal container. However, such metal container and access door are typically heavy and are costly to manufacture and install. Additionally, high-performance aircrafts typically require pressurized fuel delivery for consumption to avoid cavitation, for example. This can be achieved by providing one or more pumps throughout the fuel line between the fuel tank and the engine(s) to provide externally pressurized fuel. Although there are applications of flexible bladders for use in externally pressurized fuel systems, to externally pressurize the bladder for fuel removal most applications rely on either a metallic fuel tank to act as a pressure vessel or they seal a portion of the surrounding structure to act as a pressure vessel—both at the expense of weight, cost and mechanical complexity.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 1A shows a first vehicle type having an expandable liquid tank device in accordance with an example of the present disclosure;

FIG. 1B shows a second vehicle type having an expandable liquid tank device in accordance with an example of the present disclosure;

FIG. 4A shows a cross-sectional view of the expandable liquid tank device of FIG. 2 about lines 4A-4A;

FIG. 4B shows a partial cross-sectional view of the expandable liquid tank device of FIG. 4A, also about lines 4A-4A;

FIG. 5A shows a cross-sectional view of the expandable liquid tank device of FIG. 2 about lines 5A-5A;

FIG. 5B shows a partial cross-sectional view of the expandable liquid tank device of FIG. 5A, also about lines 5A-5A;

Figure 3:
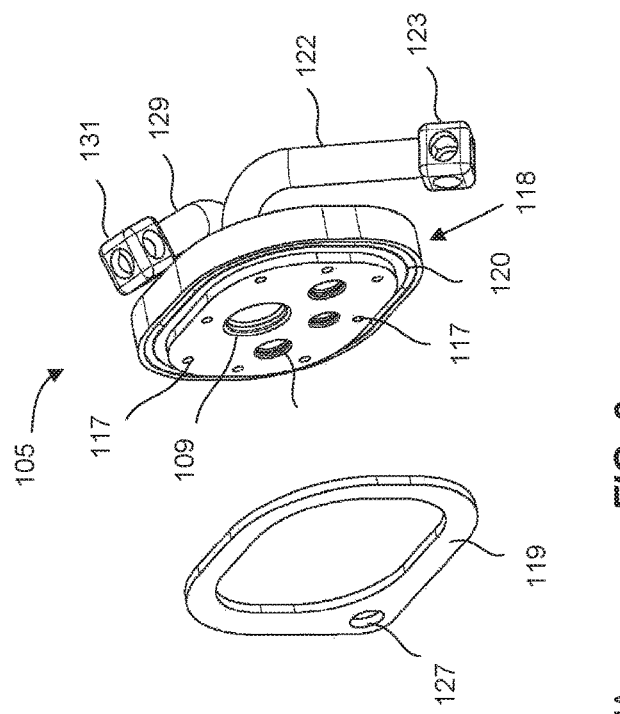
FIG. 3 shows an exploded isometric view of an end plate and sealing component of the liquid tank device of FIG. 2.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one example of the present disclosure there is provided an expandable liquid tank device positionable in a tank region of a vehicle, such as an expandable fuel tank secured to an aircraft for an externally pressurized fuel system. The liquid tank device can comprise an outer bladder having an opening and a flexible inner bladder having an opening. The flexible inner bladder can have a cavity for containing a liquid and can be positioned substantially inside the outer bladder. An end plate can be secured to the openings of the bladders and securable to the vehicle, and the end plate can have at least one aperture to through which the liquid passes (e.g., a fuel deposit and pick-up line). Upon dispensing the liquid into the flexible inner bladder, the outer bladder expands to at least partially conform to the tank region of the vehicle.

In some examples of the liquid tank device, the outer bladder comprises a gas port formed therein. A pressurization area can be in fluid communication with the gas port and defined between the flexible inner bladder and the outer bladder to receive and contain a pressurized gas. Upon injecting a pressurized gas into the pressurization area via the gas port, pressure is exerted against the flexible inner bladder to facilitate dispensing of the liquid through the at least one aperture of the end plate.

In some examples of the liquid tank device, the outer bladder transitions from a flexible state to a semi-rigid or substantially rigid state upon depositing liquid into the flexible inner bladder.

In some examples of the liquid tank device, the outer bladder and the flexible inner bladder are vulcanized together and to the end plate.

In some examples of the liquid tank device, the end plate is securable adjacent the tank region of the vehicle.

In some examples of the liquid tank device, a sealing component can secure the end plate to the inner and outer bladders and be secured to a fuselage or other structure of the vehicle. The sealing component can comprise a clinch ring vulcanized about the openings of the inner and outer bladders and to the end plate.

In some examples of the liquid tank device, a volume of pressurized gas within the pressurized area substantially corresponds to a volume of liquid dispensed from the flexible inner bladder.

In some examples of the liquid tank device, the outer bladder can be comprised of a flexible material that is pliable when the flexible inner bladder is empty and that is semi-rigid or substantially rigid when the flexible inner bladder contains the liquid.

In some examples of the liquid tank device, the outer bladder can be comprised of at least one of a woven synthetic fabric, leather, polymer, and rubber, or a combination of these.

In one example of the present disclosure there is provided a vehicle having an expandable fuel tank device. The vehicle can comprise a vehicle body and a tank region within the vehicle body. A liquid tank device can be disposed within the tank region. The liquid tank device can include some or all of the features discussed in the present disclosure. In some examples of the vehicle, the vehicle comprises an aircraft devoid of a tank access door or a metal fuel tank.

In one example of the present disclosure there is provided a method of making an expandable liquid tank device for a vehicle. The method can comprise forming an outer bladder having an opening therein. The method can comprise forming a flexible inner bladder having an opening therein. The flexible inner bladder can comprise a cavity for containing a liquid. The method can comprise positioning the flexible inner bladder substantially within the outer bladder. The method can further comprise securing an end plate to the openings of the outer and inner bladders. The end plate can have at least one aperture through which the liquid passes, wherein, upon dispensing the liquid into the flexible inner bladder, the outer bladder expands to at least partially conform to the tank region of the vehicle.

In some examples of the method of making an expandable liquid tank device, the method can further comprise forming a gas port through the outer bladder, wherein a pressurization area is in fluid communication with the gas port and defined between the flexible inner bladder and the outer bladder to receive and contain a pressurized gas. Upon injecting a pressurized gas into the pressurization area via the gas port, pressure is exerted against the flexible inner bladder to facilitate dispensing of the liquid through the at least one aperture of the end plate. The method can comprise vulcanizing the inner and outer bladders to the end plate. The method can comprise vulcanizing a sealing component to the end plate and to the inner and outer bladders.

In one example of the present disclosure there is provided a method for facilitating dispensing of a liquid from an expandable liquid tank device. The method can comprise providing an outer bladder having an opening and providing a flexible inner bladder having an opening and having a cavity for containing a liquid. The flexible bladder can be substantially positioned within the outer bladder. The method can comprise providing an end plate secured about the openings of the inner and outer bladders. The end plate can have at least one aperture through which the liquid passes. The method can comprise facilitating dispensing the liquid into the flexible inner bladder such that the outer bladder expands to at least partially conform to a tank region of the vehicle.

The method can further comprise providing a gas port through the outer bladder, wherein a pressurization area is in fluid communication with the gas port and defined between the flexible inner bladder and the outer bladder to receive and contain a pressurized gas. Upon injecting a pressurized gas into the pressurization area via the gas port, pressure is exerted against the flexible inner bladder to facilitate dispensing of the liquid through the at least one aperture of the end plate. The method can comprise facilitating mounting the end plate to the vehicle adjacent the tank region such that the outer bladder is disposed in the tank region of the vehicle. The method can comprise causing the outer bladder to expand to at least partially consume the tank region of the vehicle. The method can comprise facilitating transition of the outer bladder from a flexible state to a semi-rigid or substantially rigid state upon depositing liquid into the flexible inner bladder. The method can comprise positioning the outer bladder within the tank region of an aircraft before expanding the outer bladder.

FIG. 1A shows a first type of vehicle 100, such as an unmanned aircraft or other aircraft, having an expandable liquid tank region 102 to contain a liquid tank device 104. FIG. 1B shows a second type of vehicle 101, such as a missile, having an expandable liquid tank region 103 to contain a liquid tank device 104. The liquid tank device 104 can also be secured and used by other types of vehicles, such as an automobile or boat, that require externally pressurized fuel.

In essence, the present liquid tank device 104 comprises a self-contained fuel storage device for externally pressurized fuel systems designed to replace the typical externally-pressurized fuel system (comprised of an external rigid pressure vessel and a soft fuel bladder). The present liquid take device 104 features a two-bladder system comprised of a pliable, but inelastic outer bladder which acts as the pressure vessel and a flexible inner bladder to contain the liquid/fuel. One benefit for those applications using liquids or fuels is ease of installation and significant weight savings, opening the door for cost savings and enhanced system performance. Other benefits include, but are not limited to, ease of installation as the device/system comprises a non-rigid makeup, a precluding of the need to pressure seal any airframe sections, and savings in production unit cost.

Figure 2:
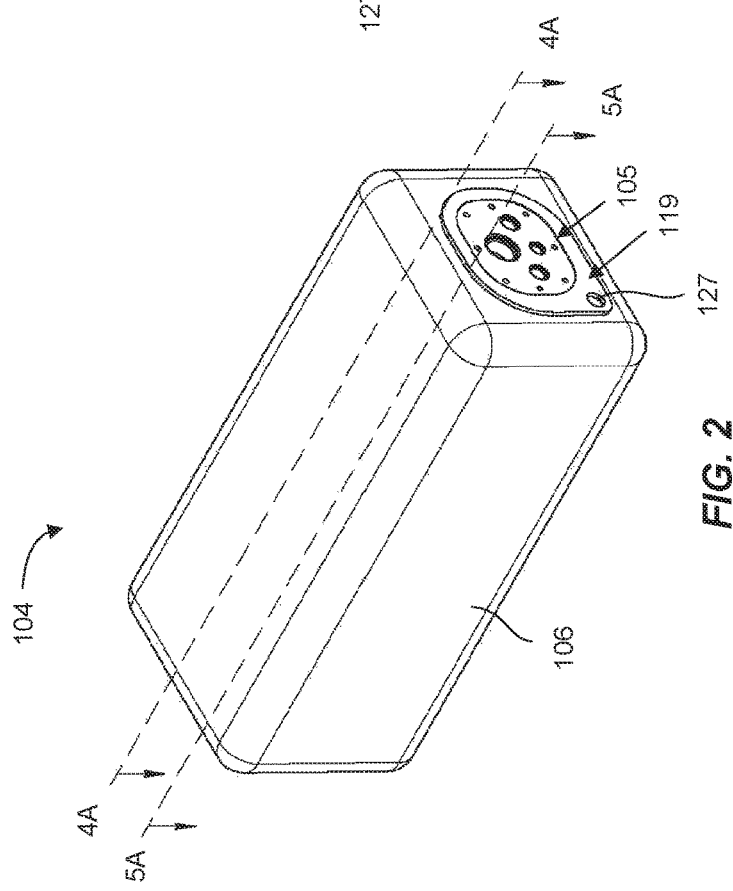
FIG. 2 shows an isometric view of an expandable liquid tank device in accordance with an example of the present disclosure.

FIG. 2 shows the expandable liquid tank device 104 that can be secured to a vehicle to provide externally pressurized liquid (e.g. fuel) to the vehicle for consumption. FIG. 3 shows an isometric view of an end plate 105 and an exploded isometric view of a sealing component 107 secured to the end plate 105. FIG. 4A shows a cross sectional view of the expandable liquid tank device 104 of FIG. 2 about lines 4A-4A (showing deflated pliable or flexible bladders), and FIG. 4B shows a partial cross-sectional view of the liquid tank device 104 of FIG. 2.

With particular reference to FIGS. 2-5B, the liquid tank device 104 can comprise an outer bladder 106 having an opening 108 and a flexible inner bladder 110 having an opening 112 (the bladders shown schematically). The flexible inner bladder 110 can have a cavity or volume 114$a$ for containing a liquid, such as a fuel F (FIG. 5A), and the outer bladder 106 can have a cavity or volume 114$b$ for containing the flexible inner bladder 110. A loop or other fastener (not shown) can be attached to an upper external area of the outer bladder and attachable to the vehicle by a strap or lanyard or other type of fastening/attaching device to maintain horizontal orientation of the bladders before filling the inner bladder with fuel, although such attachment is not necessary.

The end plate 105 can be directly secured or fastened to a support structure 115 (FIGS. 4A and 4B) of the aircraft 100 (such as to the fuselage or other support structure) by fasteners (not shown) via a plurality of apertures 117 about a perimeter of the end plate 105 (FIG. 3). The end plate 105 can be sealed or secured to the openings 108 and 112 of the bladders 106 and 110. Specifically, the end plate 105 can have an attachment perimeter 118 having an annular recess 120 secured to a perimeter area of the openings 108 and 112 of the bladders 106 and 110, respectively. A sealing component, such as a clinch ring 119, can be sealed or secured about the openings 108 and 112 of the bladders 106 and 110 by the process of vulcanization to seal the bladders to the end plate 105 and the clinch ring 119. The clinch ring 119 can be comprised of steel and can have an annular protrusion 121 (FIG. 4B) that interfaces with the annular recess 120 of the end plate 105 to pinch or position the bladders 106 and 110 between the clinch ring 119 and the end plate 105. To seal the bladders 106 and 110 to the end plate 105 and the clinch ring 119, an adhesive can be applied to both sides of the clinch ring 119, and to the openings 108 and 112 of the bladders, and about the attachment perimeter 118 of the end plate 105. Then, a heating or vulcanization process can be applied to said components to seal or secure the bladders to the end plate. Those skilled in the art will recognize other ways that the bladders 106 and 110 can be sealed to the end plate 105.

The end plate 105 can comprise an aperture 109 in fluid communication with a pick-up line 122 disposed internal of or within the flexible inner bladder 110, the pick-up line 122 being designed to selectively pass fuel into and out of the inner bladder 110 of the liquid tank device 104. When fuel is dispensed into the inner bladder 110, the outer bladder 106 is caused to expand to at least partially consume a tank region 102, 103 of the vehicle, as shown by the dashed lines on FIG. 4A. The tank region can be any shape or design, and can simply be an area in the vehicle defined by support structures of the frame of the vehicle. The expandable liquid tank device can tend to conform to the shape of the tank region, but will be limited by the particular shape of the outer bladder when fully expanded due to the inelastic properties of the outer bladder, allowing it to function as a pressure vessel.

The pick-up line 122 can have an end portion (e.g., see end portion 123 comprising a cube shape or configuration) having a plurality of spaced-apart apertures that collectively prevent undesirable suction or plugging of the flexible inner bladder 110 to the pick-up line 122 during dispensing of fuel F from the bladder 110. At least one fuel pump 125 can be in fluid communication with the pick-up line 122 to assist with providing positive pressurized fuel to the vehicle, for example.

FIGS. 5A and 5B show cross sectional views of the expandable liquid tank device 104 of FIG. 2 about lines 5A-5A. The flexible inner bladder 110 can be comprised of a flexible material, such as a flexible material that is compatible with JP-10 fuel. In one example, the inner bladder 110 can be formed of 200 denier Vectran fabric with a urethane fuel-resistant Nylon film. In other examples, the flexible material can be selected to be compatible with liquids such as gasoline, hydrogen peroxide, diesel, etc. In another example, the liquid could be water or other fire extinguishing or suppressing fluid or composition and the tank device can be used to suppress fire. In any event, the inner bladder material can be comprised of any material that will not dissolve or be damaged due to the liquid contained therein, and that is capable of being collapsed or "scrunched up" during storage and/or installation. The outer bladder 106 can be comprised of a flexible or pliable material (yet inelastic), such as a woven synthetic fabric, leather, polymer, and rubber. In one example, the outer bladder 106 can be made of 840 denier Para-Aramid fabric (makes the outer bladder non-stretchy) coated with Neoprene. In those applications where the carried liquid is fuel, the outer bladder 106 can be formed of material resistant to fuel. In another example, the outer bladder 106 can be formed of Kevlar that can withstand high pressures and high temperatures (e.g., above 20 psi and 450 degrees Fahrenheit). The outer bladder 106 can be airtight or substantially airtight and flexible, and be shaped and designed so that when inflated it is limited in size (e.g., non-stretchy) so that it can be self supported about the mount plate (i.e., not supported by other structural members). In other words, the outer bladder 106 tends to "free float" about the end plate when inflated to its designed shape.

Before fuel is deposited into the inner flexible bladder 110, both bladders are substantially deflated and pliable together such that the bladders can be positioned in a tank region of a vehicle (e.g., FIG. 4A). Once the deflated bladders are positioned in the vehicle, the end plate 116 can be fastened to the support structure 115 of the vehicle, as discussed above. Then, the inner flexible bladder 110 can be filled with fuel F (via aperture 109 through pick-up line 122), which thereby causes the outer bladder 106 to expand to its designed volume and shape to at least partially conform to the tank region. Thus, the outer bladder 106 transitions from a flexible state (FIG. 4A) to a semi-rigid or substantially rigid state (FIG. 5A) upon depositing fuel into the inner flexible bladder 110 due to the expansion of the flexible inner bladder 110 compressing against the outer bladder 106.

The liquid tank device 104 can further comprise an exhaust line 129. The exhaust line 129 can be in fluid communication with the end plate 105 and can have an end portion 131 having a plurality of spaced-apart apertures (e.g., similar to the cube of pick-up line 122) to permit passage of gases that may be contained in the flexible inner bladder 110 while depositing fuel F into the flexible inner bladder 110 (see FIGS. 3-5B for exhaust line 129). The exhaust line 129 may be coupled to an exhaust conduit (not shown) to dispense the unwanted gases out of the inner bladder 110.

Once the fuel F is contained in the flexible inner bladder 110, the pick-up line 122 can be coupled to the pump 125 (FIG. 4B) for providing or delivering pressurized fuel to an engine of the vehicle for consumption of the fuel. When the vehicle requires fuel F from the liquid tank device 104, pressurized gas G can be controllably injected via a gas port 124 (formed through the outer bladder 106) into a pressurization area P defined between the flexible inner bladder 110 and the outer bladder 106. Inflation of the outer bladder 106 can apply the necessary pressure on the inner bladder 110 to expel the fuel. FIG. 5B shows the gas port 124 coupled to a pressurized gas tank 126 via a gas line 128 (see also FIGS. 2 and 3 showing a gas aperture 127 through the clinch ring 119 in fluid communication with the gas port 124 and the pressurization area P between the bladders). The path of the pressurized gas into the pressurization area P is shown by dashed lines on FIGS. 5A and 5B. Of course, the pressurized gas G will tend to rise to an upper area of the outer bladder 106, as shown in FIG. 5A (assuming the bladders are generally horizontal to the earth's surface, such as when flying a drone 100). When the tank 104 is on a missile or other vehicle that may "bank" dramatically, the fuel pick-up line 122 and/or the exhaust line 129 may be comprised of a flexible material to properly position the lines due to gravitational forces acting on the fuel and/or the exhaust gases.

A check valve or flow metering valve (now shown) can be coupled to the gas line 128 (or other component) to assist to regulate the gas G entering the pressurization area P. The gas can be dry nitrogen or other inert gas that will not facilitate undesirable combustion. As illustrated in FIG. 5A, the pressurized gas G in the pressurization area P exerts pressure against the outside of the flexible inner bladder 110 (as illustrated by the vertically downward pointing arrows in cavity 114b), which thereby causes pressure to be exerted against the fuel F, and thereby the fuel F to be pressurized and dispensed via the pick-up line 122. In other words, upon injecting pressurized gas into the pressurization area P via the gas port 124, pressure builds within the pressurization area P, this being due to the inelastic properties of the outer bladder 106, thus causing pressure to be exerted on the inner bladder 110. With the aperture 109 in the end plate 105 that is in fluid communication with the interior of the flexible inner bladder 110 and the pick-up line 122 open, fuel F is caused to exit the inner bladder 110 through the pick-up line 122 as pressure builds within the pressurization area P and as pressure is exerted against the flexible inner bladder 110, thus facilitating the dispensing of the fuel through the at least one aperture 109 of the end plate 105, and the pick-up line 122. The at least one pump 125 can further be actuated to receive or "draw" the pressurized fuel from the flexible inner bladder 110, and can further help to pressurize the fuel for consumption by the vehicle. Providing positive pressurized fuel to the fuel pump 125 and to the fuel system of the vehicle can help prevent cavitation to the fuel systems, which can lead to poor performance or failure of propulsion systems of the vehicle. It should be noted that throughout filling and dispensing the fuel F, the outer bladder 106 maintains its semi-rigid or substantially rigid state due to the equalization of pressure between the pressurization area P and the remaining fuel F in the flexible inner bladder 110. Indeed, the volume of pressurized gas pumped into the pressurized area will substantially correspond to the volume of liquid dispensed from the flexible inner bladder 110. Moreover, the rate of fuel flow out of the flexible inner bladder 110 can be partially defined by the velocity and volume of gas injected into the pressurization area. Of course, on-board controllers can regulate the fuel consumption based on the propulsion needs of the vehicle.

Although not specifically described in detail herein, it is contemplated that some example applications may permit use of an inner and outer bladder that are both flexible or and elastic, at least to some degree. The degree of elasticity may be the same, or different between the inner and outer bladders. As such, it is contemplated that some examples may comprise an outer bladder that is not entirely inelastic. Those skilled in the art will recognize and understand that the invention is not necessarily intended to be limited to an outer bladder having totally or completely inelastic properties.

Figure 6:
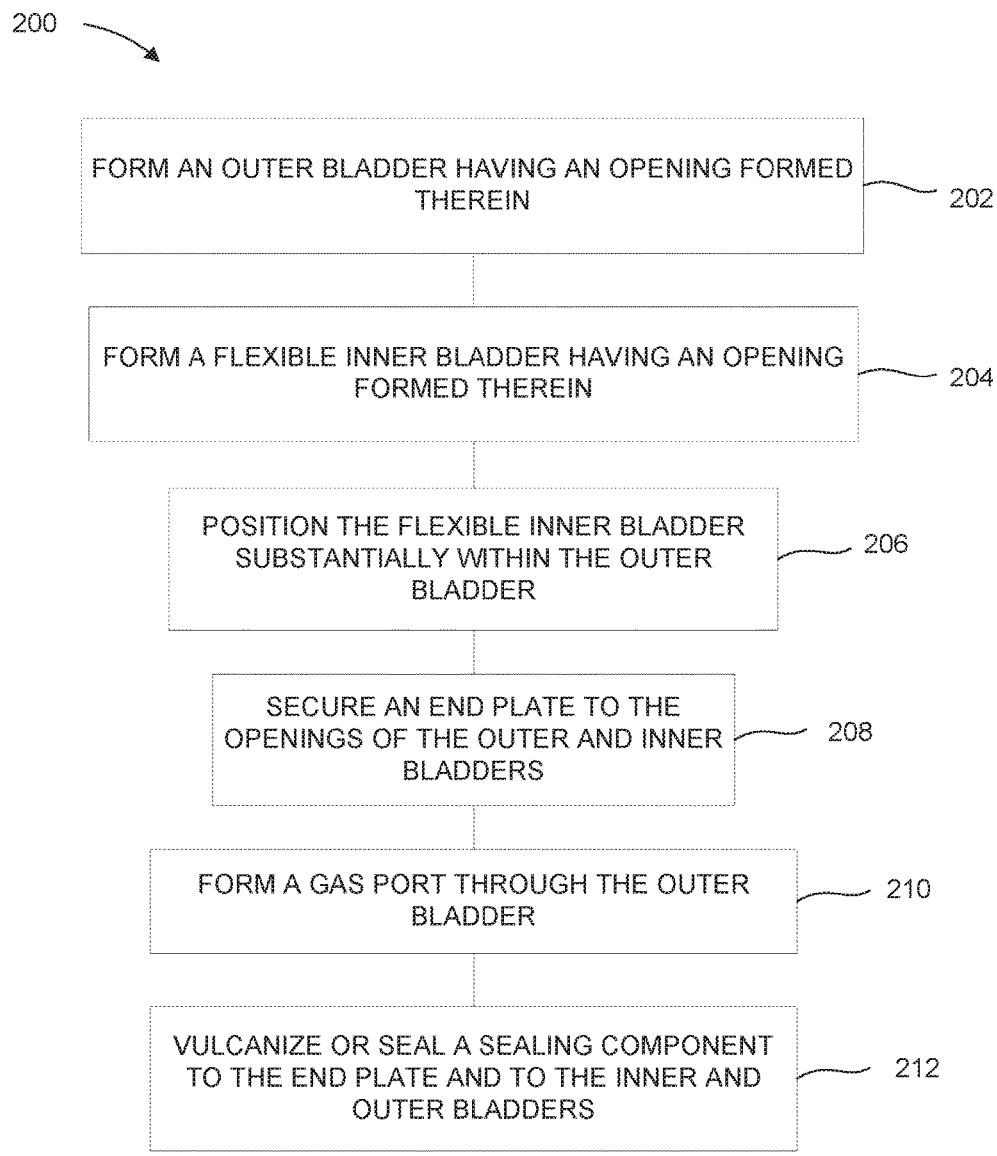
FIG. 6 illustrates a flow diagram of a method in accordance with an example of the present disclosure.

FIG. 6 illustrates a method 200 of making an expandable liquid tank device for a vehicle. The method can comprise step 202 of forming an outer bladder having an opening formed therein. Step 204 can comprise forming a flexible inner bladder having an opening formed therein. The flexible inner bladder can have a cavity for containing a liquid. Step 206 can comprise positioning the flexible inner bladder substantially within the outer bladder. Step 208 can comprise securing an end plate to the openings of the outer and inner bladders. The end plate can have at least one aperture through which the liquid passes, wherein, upon dispensing the liquid into the flexible inner bladder, the outer bladder can expand to at least partially conform to the tank region of the vehicle. Step 210 can comprise forming a gas port through the outer bladder (typically performed when forming the bladder). A pressurization area is in fluid communication with the gas port and is defined between the flexible inner bladder and the outer bladder to receive and contain a pressurized gas via the gas port. Upon injecting a pressurized gas into the pressurization area via the gas port, pressure is exerted against the flexible inner bladder to facilitate dispensing of the liquid through the at least one aperture of the end plate. Step 212 can comprise vulcanizing or sealing the inner and outer bladders to the end plate. The method can comprise vulcanizing a sealing component (e.g., a clinch ring) to the end plate and to the inner and outer bladders, as further discussed above with reference to FIGS. 2-5B describing the steps for securing said components).

Figure 7:
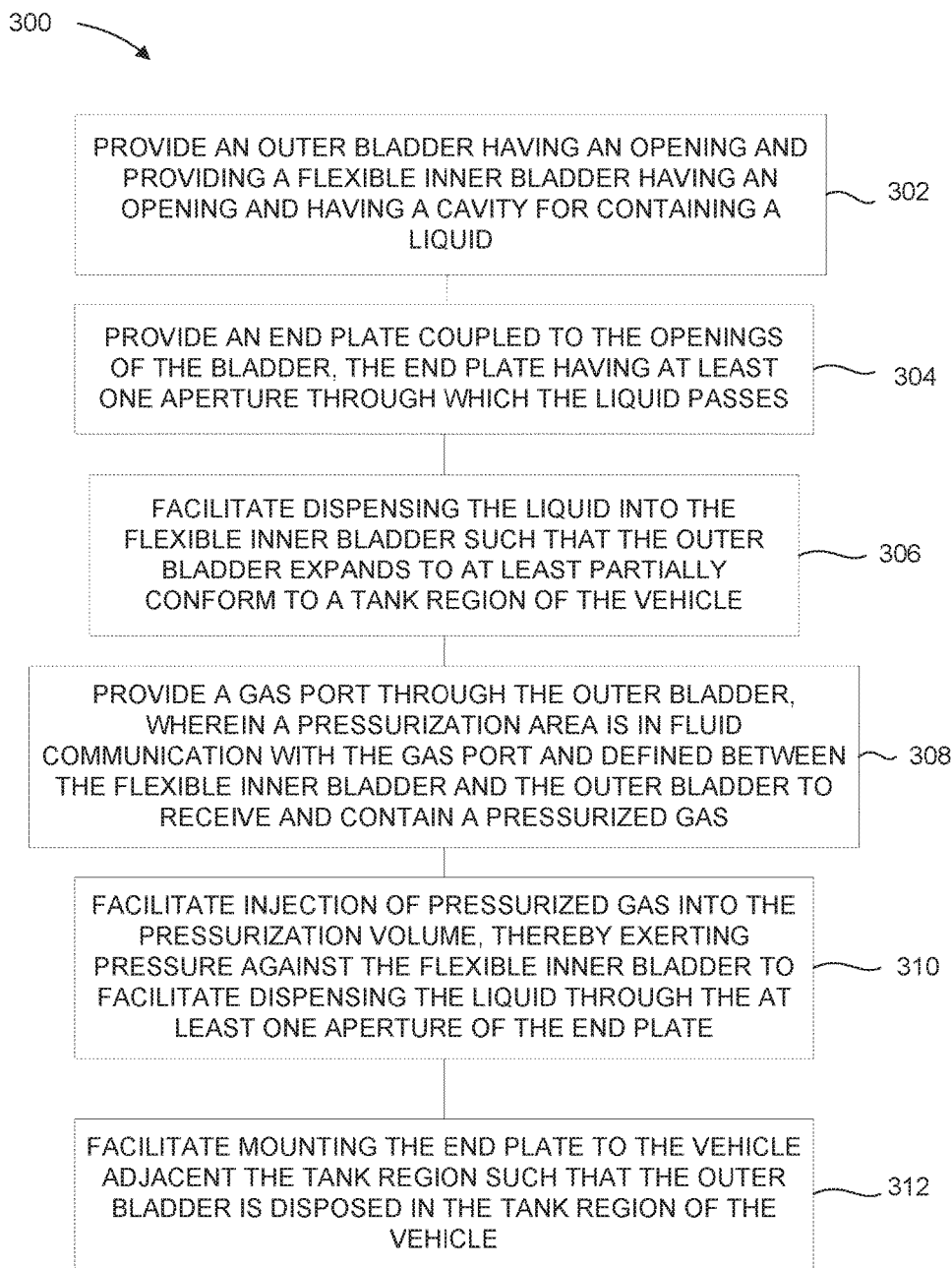
FIG. 7 illustrates a flow diagram of a method in accordance with an example of the present disclosure.

FIG. 7 illustrates a method 300 for facilitating dispensing of a liquid from an expandable liquid tank device. The method can comprise step 302 of providing an outer bladder having an opening and providing a flexible inner bladder having an opening and having a cavity for containing a liquid. The flexible bladder can be substantially positioned within the outer bladder. Step 304 can comprise providing an end plate secured about the openings of the inner and outer bladders. The end plate can have at least one aperture through which the liquid passes. Step 306 can comprise facilitating disposing the liquid into the flexible inner bladder such that the outer bladder expands to at least partially conform to a tank region of a vehicle. Step 308 can comprise providing a gas port through the outer bladder. A pressurization area is in fluid communication with the gas port and is defined between the flexible inner bladder and the outer bladder to receive and contain a pressurized gas. Step 310 can comprise facilitating injection of a pressurized gas into the pressurization area via the gas port, thereby exerting pressure against the flexible inner bladder to facilitate dispensing of the liquid through the at least one aperture of the end plate, which can provide pressurized fuel to pump or other component of a fuel system of an aircraft, for instance. Step 312 can comprise facilitating mounting the end plate to the vehicle adjacent the tank region such that the outer bladder is disposed in the tank region of the vehicle, which is preferably performed before depositing the liquid within the flexible inner bladder.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An expandable liquid tank device positionable in a tank region of a vehicle, the device comprising:
   a flexible outer bladder having an opening formed therein, and comprising a gas port;
   a flexible inner bladder having an opening, the flexible inner bladder having a cavity for containing a liquid and being positioned substantially inside the flexible outer bladder;
   a pressurization area defined between the flexible outer bladder and the flexible inner bladder, and in communication with the gas port to facilitate receiving a pressurized gas within the pressurization area; and
   an end plate secured about the openings of the flexible outer and inner bladders and securable to a vehicle, the end plate having at least one aperture through which the liquid passes,
   wherein the expandable liquid tank device is operable, upon dispensing the liquid into the flexible inner bladder, to cause the flexible outer bladder to expand to at least partially conform to a tank region of the vehicle, and
   wherein the expandable liquid tank device is operable, upon injecting pressurized gas into the pressurization area via the gas port, to pressurize the pressurization area to cause a pressure to be exerted between the flexible outer bladder and the flexible inner bladder to facilitate dispensing of the liquid from the flexible inner bladder.

2. The device of claim 1, wherein the flexible outer bladder is comprised of an inelastic material.

3. The device of claim 1, wherein the flexible outer bladder transitions from a flexible state to a semi-rigid or substantially rigid state upon dispensing liquid into the flexible inner bladder.

4. The device of claim 1, wherein the flexible outer bladder and the flexible inner bladder are vulcanized together about their openings and to the end plate.

5. The device of claim 1, wherein the end plate is securable adjacent the tank region of the vehicle, whereby the flexible outer bladder transitions from a flexible state to a semi-rigid or substantially rigid state upon dispensing the liquid into the flexible inner bladder.

6. The device of claim 1, further comprising a sealing component securing the end plate to the flexible inner and outer bladders.

7. The device of claim 6, wherein the sealing component comprises a clinch ring vulcanized about the openings of the flexible inner and outer bladders and the end plate.

8. The device of claim 2, wherein a volume of pressurized gas within the pressurized area substantially corresponds to a volume of liquid dispensed from the flexible inner bladder, such that the flexible outer bladder substantially maintains its shape in an expanded semi-rigid or substantially rigid state.

9. The device of claim 1, wherein the flexible outer bladder is comprised of a flexible material that is pliable when the flexible inner bladder is empty and that is semi-rigid or substantially rigid when the flexible inner bladder contains the liquid.

10. The device of claim 9, wherein the flexible outer bladder is comprised of at least one of a woven synthetic fabric, leather, polymer, and rubber.

11. An expandable liquid tank device positionable in a tank region of a vehicle, the device comprising:
    an outer bladder positionable in a tank region of a vehicle, and comprising a gas port; and
    a flexible inner bladder being substantially positioned inside the outer bladder;
    a pressurization area defined between the outer bladder and the flexible inner bladder, and in communication with the gas port to facilitate receiving a pressurized gas within the pressurization area;
    wherein, upon injecting pressurized gas into the pressurization area via the gas port, pressure is exerted between the outer bladder and the flexible inner bladder to facilitate dispensing liquid out of the flexible inner bladder.

12. The device of claim 11, wherein, upon dispensing liquid into the flexible inner bladder, the outer bladder expands to at least partially conform to the tank region of the vehicle.

13. The device of claim 11, wherein the outer bladder is operable to transition from a flexible state to a semi-rigid or substantially rigid state upon dispensing liquid into the flexible inner bladder.

14. The device of claim 11, further comprising an end plate secured about the openings of the outer and inner bladders and securable to the vehicle, the end plate having at least one aperture through which the liquid passes about the flexible inner bladder, wherein the outer bladder comprises a gas port in fluid communication with the pressurization area for injecting pressurized gas into the pressurization area.

* * * * *